T. V. BUCKWALTER.
TRACTOR ENGINE.
APPLICATION FILED NOV. 25, 1912.
1,161,922.
Patented Nov. 30, 1915.
2 SHEETS—SHEET 2
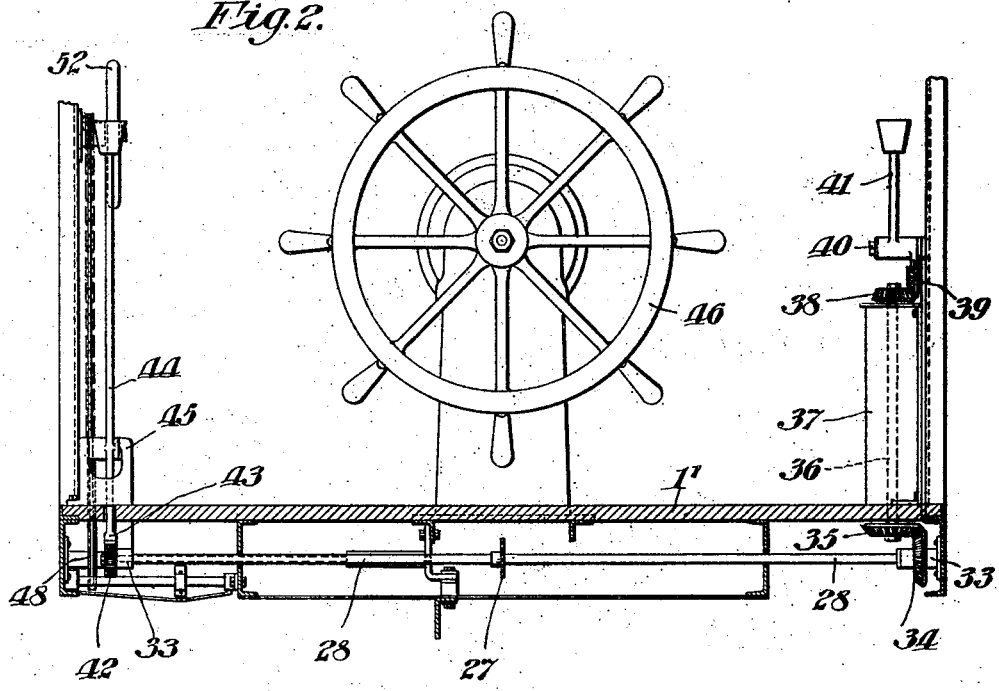
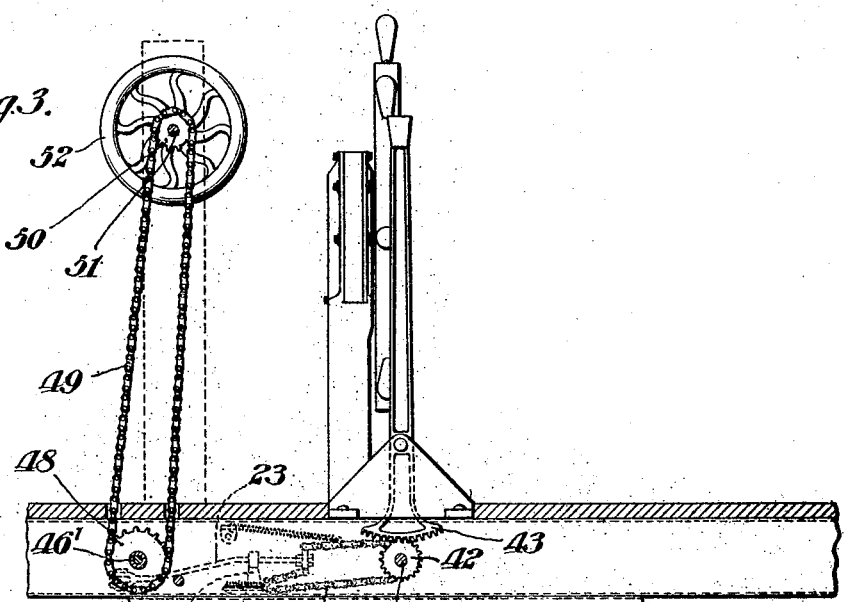

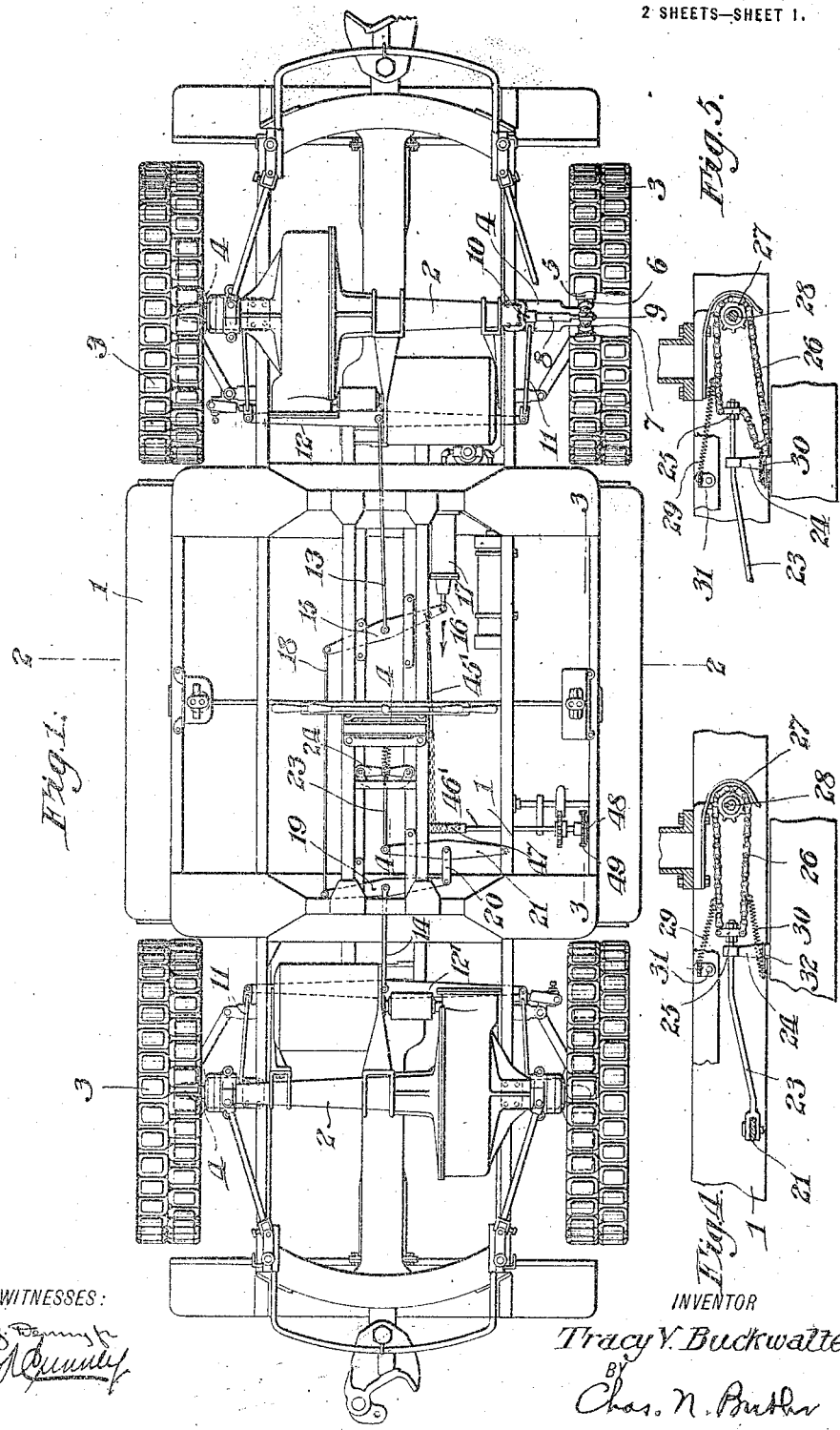

UNITED STATES PATENT OFFICE.

TRACY V. BUCKWALTER, OF ALTOONA, PENNSYLVANIA.

TRACTOR-ENGINE.

1,161,922.  Specification of Letters Patent.  Patented Nov. 30, 1915.

Application filed November 25, 1912. Serial No. 733,283.

*To all whom it may concern:*

Be it known that I, TRACY V. BUCKWALTER, a citizen of the United States, residing at Altoona, in the county of Blair and State of Pennsylvania, have invented certain Improvements in Tractor-Engines, of which the following is a specification.

My invention relates to tractor engines such as are propelled by electric power, and its leading purposes are to conserve power, particularly the energy of storage batteries, by preventing the regulation of the speed by the application of the brakes when the power is on, to conduce to safety by automatically throwing off the power by the application of the brakes, and to simplify the operations by the reduction of the number of movements required therefor.

In the practice of the invention, the controller and the brakes are connected so that the operation which applies the brakes whether by air or hand, throws the controller to the neutral or "off" position, and the current cannot be applied when the brakes are on or until they are released.

While the present application of my invention is to use in and for the improvement of tractor engines, it will be understood that it is also applicable to, and intended for use with, motor trucks and other power propelled and brake controlled machines.

In the accompanying drawings, Figure 1 is a partly sectional plan view of tractor engine having my improvements applied thereto, Fig. 2 is a sectional view on the line 2—2 of Fig. 1, Fig. 3 is a sectional view on the line 3—3 of Fig. 1, Fig. 4 is a sectional view on the line 4—4 of Fig. 1 in illustration of the connections between the controller and braking mechanisms with the current off and the brakes on, and Fig. 5 is a view of the construction shown in Fig. 4 with the current on and the brakes off.

The mechanism illustrated in the drawings comprises a tractor engine having the frame 1 with the axles 2 connected to the traction wheels 3 by the usual knuckles 4. The wheels have the brake drums 5 fixed thereto and the brake bands or shoes 6 are connected therewith so that they move together about the axes of the knuckles. The ends of the bands turn on the semi-cylindrical blocks 7 which are spread to apply the brakes by turning the revoluble shafts 8 having the flattened ends 9 between the blocks. The shafts 8 are provided with transversely extending arms 10 which are connected by links 11 with the ends of the levers 12 and 12', each lever operating the brakes for a pair of wheels at an end of the machine and being operated by the respective draw rods 13 and 14. The rod 13 is pivotally connected to the middle of a floating lever 15 having one end thereof pivotally connected to the piston rod 16, operated by air in the cylinder 17, and the other end pivotally connected to the rod 18. The rod 14 is pivotally connected to the middle of a floating lever 19 which has one end pivotally connected with the rod 18 and the other end connected by the link 20 with the middle of a lever 21, the latter having one end pivotally connected to the frame 1 and the other end pivotally connected to the rod 23. The rod 23, movable longitudinally through the bearing 24 on the frame 1, is fixed to the yoke 25 to which are connected the ends of a sprocket chain 26 that passes over a sprocket wheel 27 fixed on a shaft 28. The ends of the chain 26 are connected by the respective springs 29 and 30 with the anchors 31 and 32 which are fixed to the frame, the springs acting to keep the chain taut and hold it in or bring it to the normal position shown in Fig. 4.

The shaft 28, having its ends journaled in the bearings 33, has fixed on one end thereof a beveled gear 34 which meshes with a beveled gear 35 fixed on the shaft 36 of the controller 37. The shaft 36 has fixed thereon a beveled gear 38 which meshes with a beveled segmental gear 39 that is adapted to be rocked about an arbor 40 by a lever 41. The shaft 28 has, fixed at the other end thereof, the gear wheel 42 with which meshes a segmental gear 43 on a lever 44 which is fulcrumed on the bearing 45.

It will be understood that the operator on the platform 1', who steers the engine through the wheel 46, can operate the controller by operating either lever 41 or 44 from either side of the wheel 46 on either side of the platform. If the lever 41 be rocked it will act through the gears 39 and 38 to throw the current on or off, depending on the direction of its movement, and the consequent movement of the shaft 36 will be transmitted through the gears 35 and 34 to rotate the shaft 28; and if the lever 44 be rocked it will act through the gears 43 and 42 to rotate the shaft 28 with the gear 34 thereon which acts through the gear 35 to operate the controller and throw the current on or off, depending upon the direction of the movement. The revolving shaft 28 acts through the sprocket wheel 27 on the chain 26 and causes the same to draw the rod 23 when such wheel is turned in either direction from the neutral position shown in Fig. 4 to affect either the forward or the reverse motion of the engine.

When air is admitted to the cylinder 17 to apply the brakes, the rod 16 acts through the parts 15, 18, 19, 20 and 21 on the parts 23 and 26 to move them from the position shown in Fig. 5, in which the current is on, to the position shown in Fig. 4, in which the current is off, due to the revolution of the wheel 27 by the chain 26 in the operation of restoring the latter to the neutral position. When the mechanism has been moved to the position shown in Fig. 4, the lever 21 is held stationary and the force communicated from the cylinder 17 acts through the parts 16, 15, and 13 upon the beam 12 and through the parts 16, 15, 18, 19, and 14 upon the beam 12′, whereby the beams 12 and 12′ are drawn toward each other and act through the respective parts 11, 8 and 9 to apply the brakes.

The lever 15 has its end, which is connected to the rod 16, also connected to the rod 45′ which is in turn connected to a shaft 46′ through a chain 47 adapted to be wound thereon. This shaft has fixed thereon the sprocket wheel 48 which is connected by a link belt or sprocket chain 49 with a revoluble sprocket wheel 50 carried by a shaft 51, the wheel 50 being turned by a hand wheel 52. The wheel 52 can be turned and caused to act through wheel 50, chain 49, wheel 48, shaft 46′, chain 47 and link 45′ to operate the lever 15 and apply the brakes independently of the air, the controller mechanism being thrown to the "off" position simultaneously therewith as previously described.

Having described my invention, I claim:

1. The combination of the braking mechanism, the controlling mechanism, means comprising a revoluble shaft adapted to operate and be operated by the controlling mechanism, and means comprising a sprocket wheel and chain whereby said braking mechanism can turn said shaft and said shaft can shift said braking mechanism.

2. The combination of traction wheels with frictional brakes, brake operating means comprising a reciprocating rod, a rotary shaft, means connecting said shaft and rod whereby each can operate the other, power controlling mechanism, and means connecting said mechanism with said shaft whereby the operation of applying said brakes first operates said mechanism to cut off the power.

3. The combination of a controller, means for manually turning said controller, a shaft, means for connecting said controller and shaft, so that each is adapted for operating the other, braking mechanism, fluid pressure mechanism for applying said braking mechanism, and means connecting said shaft and said braking mechanism whereby the operation of said fluid pressure mechanism in applying said braking mechanism first moves said controller to the "off" position.

4. The combination of a controller, means for manually operating said controller, a shaft, means connecting said shaft and controller so that the operation of either will operate the other, separate means for manually operating said shaft, and braking mechanism connected with said shaft so that the operation thereof to apply the brakes first operates the controller to throw off the power.

5. The combination of a controller shaft, gears fixed to said shaft, manually operated means comprising a gear meshing with one of said gears first named whereby said shaft can be turned, a second shaft, a gear fixed on said second shaft and engaging the other of said gears first named whereby said shafts are caused to revolve together, braking mechanism and means for connecting said second shaft and braking mechanism in inter-dependent relation.

6. The combination of a controller shaft, means for manually turning said shaft, a second shaft, means for connecting said shafts so that each is adapted for turning the other, braking mechanism, means for manually applying said braking mechanism, and means for connecting said second shaft and said braking mechanism in inter-dependent relation.

7. A machine having traction wheels, braking means for said wheels, a reciprocating rod adapted for shifting said braking means, a revoluble shaft, a sprocket wheel fixed to said shaft, a sprocket chain on said sprocket wheel with ends fixed to said rod, controller mechanism connected with and adapted to be operated by said shaft, and means for automatically returning said controller mechanism to the neutral position.

8. A machine having traction wheels, braking means for said wheels, a reciprocating rod, a sprocket chain having two points of connection with said rod, a sprocket wheel engaged by said chain, a revoluble shaft on which said sprocket wheel is fixed, and resilient mechanism acting through said chain to move the same to a neutral position.

9. A machine having traction wheels, braking means for said wheels, a reciprocating rod, a sprocket chain having two points of connection with said rod, a sprocket wheel engaged by said chain, a revoluble shaft on mechanism, means for connecting said shaft and controller mechanism and resilient means acting on said chain to effect the restoration of said controller mechanism to the neutral position.

10. The combination of power controlling mechanism, braking mechanism, mechanism comprising floating levers connected with said power controlling and braking mechanisms, and means for limiting the movement of a lever of said lever mechanism to provide a fulcrum for the application of power to said braking mechanism.

In testimony whereof I have hereunto set my name this 16th day of November, 1912, in the presence of the subscribing witnesses.

TRACY V. BUCKWALTER.

Witnesses:
   Geo. A. Cunney,
   Jos. G. Denny, Jr.